United States Patent Office 2,719,146
Patented Sept. 27, 1955

2,719,146

PROTEIN DERIVATIVES AND PROCESS OF PREPARING THEM

Hans Rudolph Schwander, Bern, Switzerland, assignor to E. I. du Pont de Nemours and Company, Wilmington, Del., a corporation of Delaware No Drawing. Application March 17, 1953, Serial No. 342,991

9 Claims. (Cl. 260—117)

This invention relates to protein derivatives. More particularly it relates to gelatin derivatives containing ureido groups. The invention further relates to a process of preparing such derivatives.

Various protein derivatives are known and they have widely diverse properties which depend upon the reactants used as well as the temperature and duration of the treatment. Insofar as applicant is aware no gelatin and related protein derivatives have been prepared which have amino groups of the protein molecule converted into ureido groups which are unsubstituted.

An object of this invention is to provide a new class of protein derivatives. A more specific object is to provide a new class of gelatin derivatives. A more specific object is to provide such derivatives which contain ureido groups. A further object is to provide a new process of preparing protein colloid derivatives. Still other objects will be apparent from the following description of the invention.

It has been found that protein colloids, particularly those of the water-permeable type, and especially gelatin can be reacted in aqueous media with nitrourea to form protein derivatives containing ureido groups.

The primary amino groups of the protein molecules react with the nitrourea as follows:

By varying the amount of the nitrourea one can control the number of ureido groups in the protein molecule or molecules. Thus, by a low substitution reaction the derivatives retain most of the properties of the original protein colloid while adding new properties. The ureido groups make the protein derivatives less reactive with various reagents, particularly acids.

The proportion of nitrourea to protein can be varied up to equal proportions by weight of the two reactants without destroying the water-permeable colloid characteristics of the protein. In the case of gelatin, these proportions result in products which are useful as colloid binding agents for silver halide grains. At the same time the isoelectric point of the gelatin is reduced markedly, for instance, to 4.4 and below, and the total number of basic groups is also reduced.

The reaction temperature should be kept below the degradation temperature of the gelatin or other protein. The most effective temperature depends not only on the particular protein but on the concentration. In general, temperatures from 50 to 176° F. are useful with aqueous concentrations of 1% to 40% by weight of the protein. In the case of gelatin these temperatures are preferably 59° to 104° C. with aqueous gelatin solutions of 5% to 15% strength. The reaction period may vary from ½ to 72 or more hours. In general, 1 to 12 hours are adequate to introduce a substantial amount of ureido groups. The pH is preferably adjusted to the alkaline side during the reaction. This can be accomplished by the addition of a dilute alkali metal hydroxide solution, e. g. NaOH or KOH solutions, by the addition of sodium carbonate or potassium carbonate, etc.

While gelatin is the preferred colloid, the invention is applicable to zein, albumin, casein and related protein colloids and they can be substituted in like manner in the procedure of the example below.

The invention will be further illustrated but is not intended to be limited by the following examples.

EXAMPLE I

Fifteen (15) grams of limed bone gelatin derived from India bone is dissolved in 100 ml. of water at a pH of 5.36 and a temperature of 32° C. Ten (10) grams of nitrourea prepared as described below is stirred into this dispersion. The nitrourea dissolves rapidly and the pH after complete addition is 3.12. The pH is then adjusted to 8.7 by the addition of sodium hydroxide solution. The gelatin solution is set aside in a covered vessel after the addition of a small amount of preservative (thymol). On standing, the solution is set to a gel. Over night the gel is transformed into a coarse sponge with the evolution of $N_2O$ gas. The spongy material is allowed to stand in the beaker for two more days at which time the spongy gel was cut into small pieces, placed in a Büchner funnel and washed with tap water with periodic filling and draining of the funnel. The spongy material swells considerably during washing. It is dried at 100° F., providing 12 grams of air-dried material. The isoelectric point of the original gelatin is pH 5.3. The gelatin after treatment with nitrourea as described has an isoelectric point at pH 4.4. This indicates that a substantial portion of the amino groups in the gelatin is transformed to urea groups.

EXAMPLE II

Another 25-gram sample of the same gelatin used in the preceding experiment is mixed with 50 ml. of water (distilled) and 20 grams of nitrourea is added to form a paste. Water is added and the system heated on a water bath to obtain a solution. The pH is adjusted to 8.7 with sodium hydroxide, giving a final volume of about 200 ml. of a homogeneous solution. A small quantity of thymol preservative is added and the gelatin solution is allowed to stand covered at room temperature. Inspection after two days shows that the solution has set to a gel of spongy consistency due to the generation of $N_2O$. This gel is cut into small pieces, washed with running tap water on a large Büchner funnel, and dried at 90° F. The isoelectric point of the original gelatin was about pH 4.95. The isoelectric point of the nitrourea treated product was about 4.1. Using the method of Fraenkel-Conrat and Cooper, J. Biol. Chem. 154, 239–246 (1944), it was determined that the introduction of ureido groups had reduced the total number of basic groups by 28%.

The nitrourea used as a reactant in practicing the invention can be made from urea nitrate. The former and latter compounds can be made by the following procedures:

Procedure A.—Urea nitrate

One hundred and fifty (150) grams of chemically pure urea are dissolved in 150 ml. of water. About 250 ml. of concentrated nitric acid (density 1.4, 70%) is added to this solution in small portions with stirring. Considerable heat is generated and immediately a slurry of precipitated urea nitrate is formed. The reaction mixture is cooled externally in a cold water bath and the beaker with precipitate is stored in a refrigerator to obtain complete crystallization. The precipitate is separated from the supernatant liquid by filtration on a large glass sintered filter. It is washed with a small amount of cold 50% alcohol and then with several small portions of cold alcohol. The precipitate is sucked on the filter for some time to remove as much alcohol as possible and dried in a desiccator over calcium chloride.

*Procedure B.—Nitrourea from urea nitrate*

Three hundred (300) ml. of concentrated sulfuric acid are cooled down in a 1-liter beaker with a mixture of ice and salt with stirring. When the temperature has fallen to −5° C. the urea nitrate prepared as above is added in small portions so that the temperature does not exceed −3° C. Two hundred (200) grams of the urea nitrate were added in the course of about one hour. After the addition of the urea nitrate, stirring is discontinued; and after one minute, the contents of the beaker are poured into about 1 liter of ice in a 3-liter beaker. A very fine precipitate of nitrourea forms immediately. The nitrourea is separated from the water on a sintered glass filter and washed with small amounts of ice water and then sucked dry. The nitrourea is then recrystallized by dissolving in boiling ethanol (about 7–800 ml.). The solution is filtered before recrystallization which starts immediately on cooling. A compact mass of fine white crystals is formed. The crystals are filtered from the solution and washed with alcohol and then with ether. The product is obtained in white pearly leaflets and dried in a desiccator over calcium chloride/sulfuric acid. The final yield is approximately 76 grams. The product is stored in a brown glass bottle with an inner coating of polyvinyl acetate to protect the alkali-sensitive nitrourea from the glass.

The products of this invention and of the foregoing examples are useful as colloid binding agents for silver halide grains and for water-insoluble pigments and dyes in filter and anti-halation layers of photographic elements. They may also be used in subbing layers and anti-abrasion layers of photographic films. They are also useful in glue compositions, in dye printing pastes and, in general, are substitutes for gelatin and related water-permeable colloids. Wherever, they are employed, the ureido derivatives of this invention have the same water-permeable properties of gelatin and are useful equivalents thereof.

An advantage of the invention is that it provides a new class of water-permeable protein derivatives. Another advantage of the invention is that it provides a simple and effective method of reducing the isoelectric point of gelatin. A further advantage is that it provides new chemical intermediates. A still further object is that it provides a simple and practical method for introducing unsubstituted ureido groups into gelatin and other colloids.

What is claimed is:

1. A modified gelatin containing unsubstituted ureido groups as the sole substituent groups.

2. A modified gelatin containing unsubstituted ureido groups as the sole substituent groups and having an isoelectric point below 4.5.

3. A water-permeable modified gelatin containing unsubstituted ureido groups of the formula

—NH—CONH$_2$

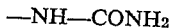

wherein the nitrogen of the —NH— group in the said formula is linked to the carbon atom originally attached to the amino nitrogen atom of the gelatin, said ureido groups being the sole substituent groups.

4. A water-permeable modified gelatin containing unsubstituted ureido groups of the formula

—NH—CONH$_2$

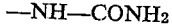

wherein the nitrogen of the —NH— group in the said formula is linked to the carbon atom originally attached to the amino nitrogen atom of the gelatin, said ureido groups being the sole substituent groups, said modified gelatin having an isoelectric point below 4.5 and possessing water-permeable colloid characteristics.

5. The process of preparing a modified protein containing unsubstituted ureido groups which comprises reacting an aqueous solution of a water-permeable protein with nitrourea at a temperature below the degradation temperature of the protein.

6. The process of preparing a modified protein containing unsubstituted ureido groups which comprises reacting an aqueous solution of a water-permeable protein with nitrourea at a temperature from 50° F. to 176° F. for ½ to 72 hours.

7. The process of preparing a modified protein containing unsubstituted ureido groups which comprises reacting an aqueous solution of a water-permeable protein with nitrourea at a temperature from 50° F. to 176° F. and a pH above 7 for ½ to 72 hours.

8. The process of preparing a modified gelatin containing unsubstituted ureido groups which comprises reacting an aqueous solution of gelatin with nitrourea at a temperature from 50° F. to 176° F. in the presence of an alkali metal hydroxide at a pH above 7 for a period of 1 to 12 hours.

9. The process of preparing a modified gelatin containing unsubstituted ureido groups which comprises reacting an aqueous solution containing 1% to 40% by weight of gelatin with nitrourea in the proportion of 1.0 part of gelatin to 0.67 to 1.0 part by weight of nitrourea, at a temperature from 50° to 176° F. and a pH above 7 for a period of ½ to 72 hours.

References Cited in the file of this patent

UNITED STATES PATENTS 2,484,481     Arthur               Oct. 11, 1949

OTHER REFERENCES

Sah: Chem. Abstr., vol. 28, col. 6122 (1934).
Sah et al.: Chem. Abstr., vol. 31, col. 6203 (1937).